(12) United States Patent
Minadakis

(10) Patent No.: US 7,561,161 B2
(45) Date of Patent: Jul. 14, 2009

(54) QUANTITATIVE MEASURE OF A VIDEO INTERFACE

(75) Inventor: Yannis Minadakis, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 770 days.

(21) Appl. No.: 11/046,504

(22) Filed: Jan. 28, 2005

(65) Prior Publication Data

US 2006/0188174 A1      Aug. 24, 2006

(51) Int. Cl.
G06F 9/46     (2006.01)
G06T 1/00     (2006.01)

(52) U.S. Cl. ............... 345/501; 345/520; 718/104

(58) Field of Classification Search ......... 345/501–503, 345/520, 522, 419, 428; 718/104
See application file for complete search history.

(56) References Cited

U.S. PATENT DOCUMENTS

| | | | |
|---|---|---|---|
| 5,642,171 A | | 6/1997 | Baumgartner et al. |
| 6,321,293 B1 | | 11/2001 | Fabrizio et al. |
| 6,487,578 B2 | * | 11/2002 | Ranganathan ............... 718/104 |
| 6,973,653 B1 | * | 12/2005 | Fairman et al. ............. 718/104 |
| 7,015,919 B1 | * | 3/2006 | Stauffer et al. .............. 345/543 |
| 2001/0020942 A1 | * | 9/2001 | Basso et al. ................. 345/428 |
| 2002/0147759 A1 | * | 10/2002 | Ranganathan ............... 709/104 |
| 2003/0170006 A1 | * | 9/2003 | Bogda et al. ................. 386/96 |
| 2005/0008254 A1 | | 1/2005 | Ouchi et al. |

OTHER PUBLICATIONS

Thomas Pabst; 3D Benchmarking—Understanding Frame Rate Scores; http://www1.graphics.tomshardware.com/graphic/20000704/index.html; Jul. 4, 2000; 24 pp.; TG Publishing AG 1996-2005.

* cited by examiner

Primary Examiner—David L Lewis
(74) Attorney, Agent, or Firm—Marshall, Gerstein & Borun LLP

(57) ABSTRACT

A method and system for quantitatively measuring performance of a video interface is disclosed. The method and system determine an effectives frames per second based upon a measured frames per second that is rendered by the video interface and system resource utilization by the video interface during execution of a benchmark.

18 Claims, 5 Drawing Sheets

US 7,561,161 B2

QUANTITATIVE MEASURE OF A VIDEO INTERFACE

TECHNICAL FIELD

This invention generally relates to computer systems. More particularly, this invention relates to a method and system for quantifying performance of a video interface.

BACKGROUND OF THE INVENTION

Many application programs provide video output, e.g. display of images on a computer monitor, during execution. Such video output is controlled, in part, by a video interface which includes a software module called a display driver and hardware component which connects to the monitor called a video card. The display driver receives requests from the application program and translates the requests into instructions that are understood by the video card. The video card executes the instructions, which process results in desired images being rendered and displayed on the monitor.

A frame is a static display of images on the monitor at a particular time. Animation, i.e. moving images, is achieved by rendering and displaying successive frames. Some application programs, such as certain games, rely heavily upon animation during execution. The performance of these applications programs on a computer system depends upon how well that system is able to display the desired animations while the application executes. This depends in large part on the quality of the video interface.

Video interfaces are rated using certain metrics. One example of a metric is a measured frames per second (FPS). The measured FPS is obtained by executing a benchmark, e.g. a portion of an application that uses video output, to determine how many frames are displayed over time. The number of frames displayed is divided by the benchmark execution time to arrive at the FPS value. Once measured, the FPS value is supposed to provide a comparative measure of the performance that will be achieved using a particular video interface. The larger the FPS value, the better the video interface is supposed to perform.

FPS does not, however, necessarily provide an accurate reflection of the relative performance that will be achieved in general. Video interface performance depends on many system resources, including the CPU and how efficiently the computer is used. Thus, the benchmark needs to simulate all possible scenarios of system resource utilization for the FPS to accurately represent the video performance that will be achieved with different computer systems. It is not practical, however, to design such a benchmark.

SUMMARY OF THE INVENTION

The invention is directed to a method and system of obtaining a quantitative measure of relative performance of a video interface that includes a display driver and video card. In accordance with the invention, a benchmark process is executed to send a plurality of requests to the video interface and a measured frames per second value is determined. A determination is made of utilization of system resources by the video interface while the benchmark executes. The determined system utilization is used in combination with the measured frames per second to determine an effective frames per second. The effective frames per second quantifies the relative performance of the video interface.

In an embodiment of the invention, the system utilization is a measure of the resources that are consumed as a result of benchmark execution and of the resources that remain available during execution of the benchmark.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
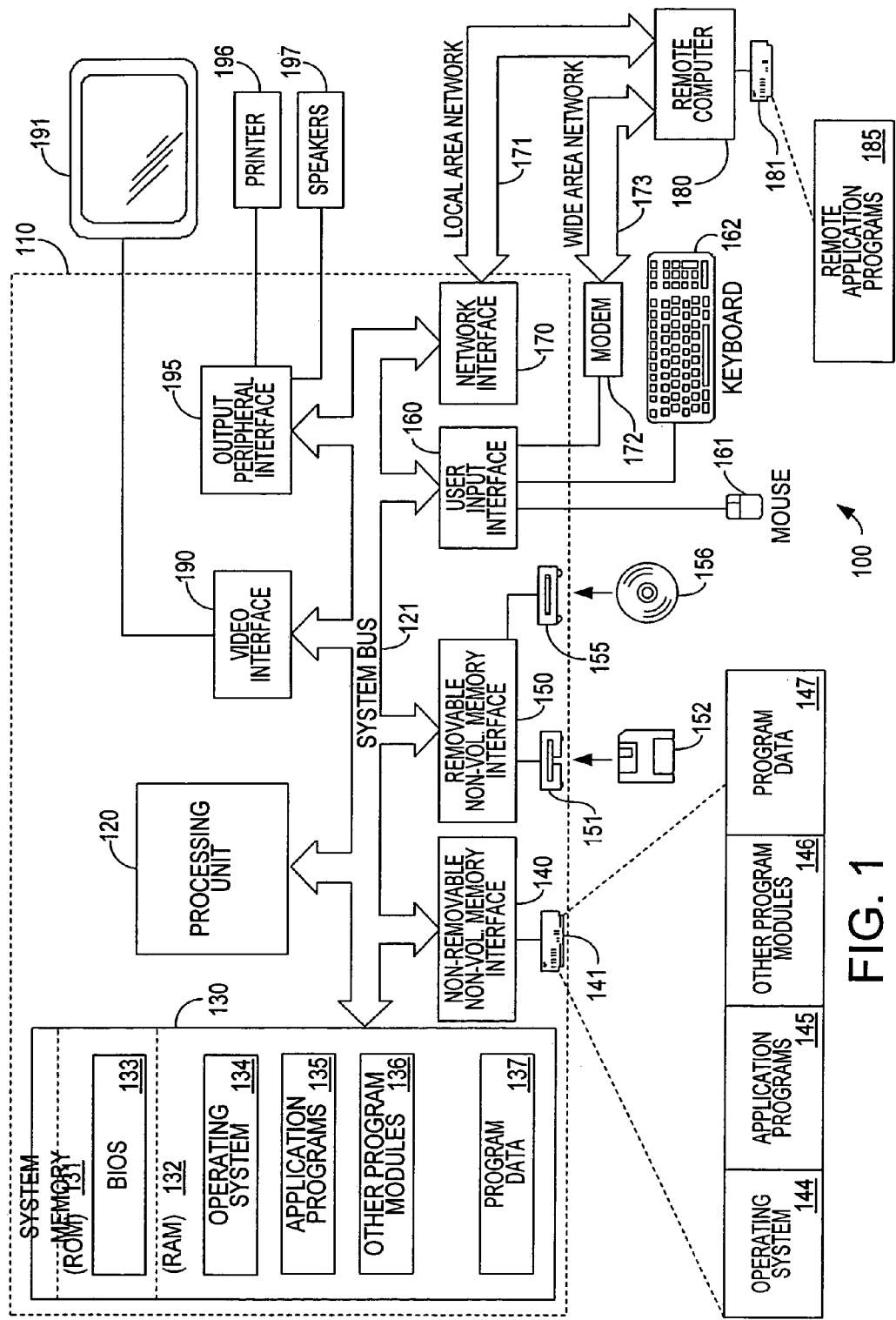
FIG. 1 is a block diagram generally illustrating an example of a computer system that may be used to carry out the present invention.

A method and system for quantifying the performance of a video interface will now be described with respect to certain embodiments. In accordance with the disclosed method and system, an effective frames per second value is determined for a video interface. The effective frames per second value is based upon a measured frames per second and system utilization. The measured frames per second is the number of frames per second displayed by a video card during execution of a benchmark process. System utilization is based upon determined values that correspond to the system resources that are consumed and system resources that remain available during execution of the benchmark process.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that performs particular tasks or implement particular abstract data types. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
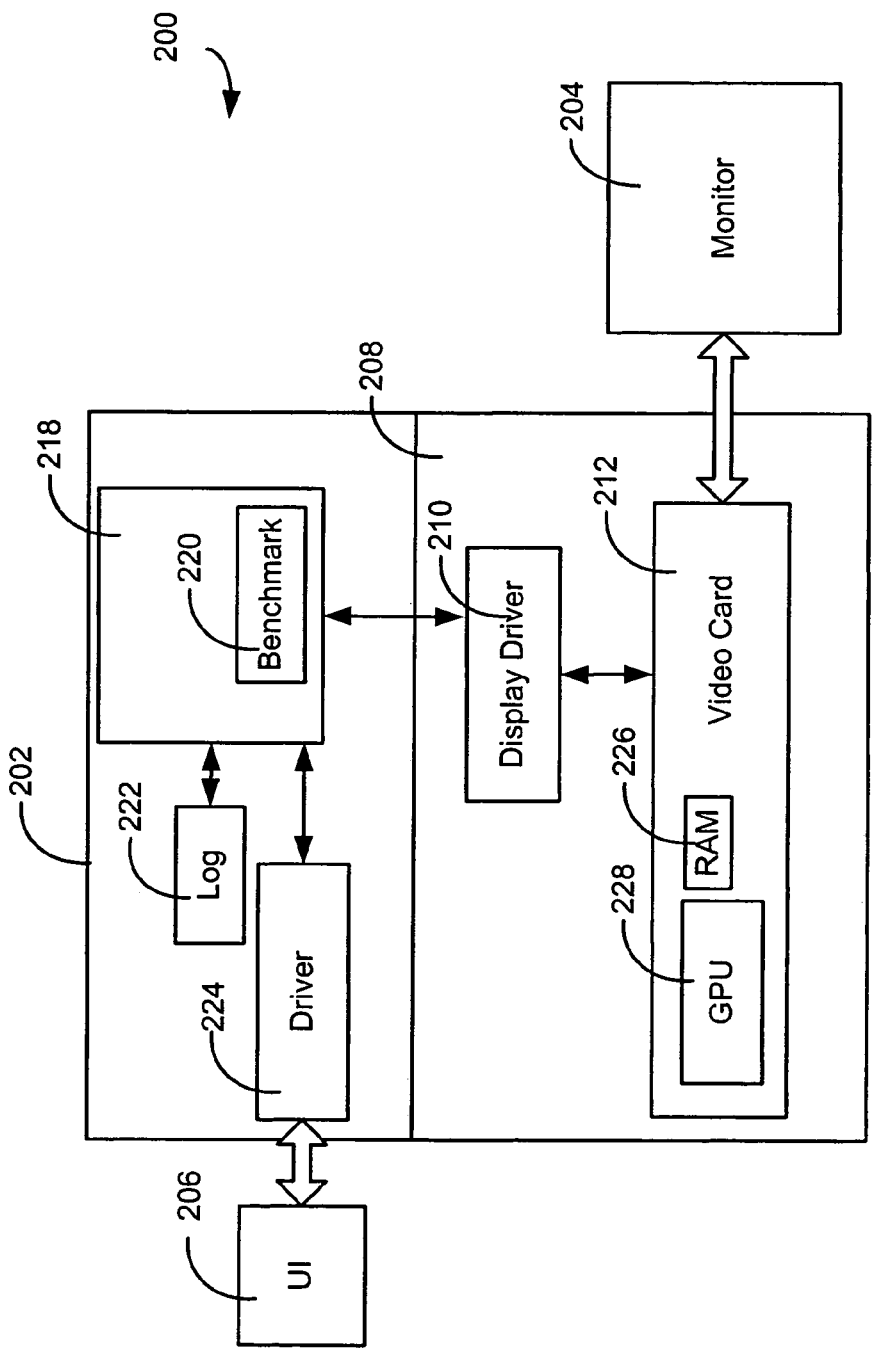
FIG. 2 is a block diagram generally illustrating an example of an operating environment wherein the present invention is employed.

FIG. 2 illustrates a block diagram of an exemplary operating environment 200 wherein the method and system of the present invention may be employed. The invention includes an evaluation module that uses a measured frames per second produced by a video interface and determined consumed and available resources during execution of a benchmark process to calculate an effective frames per second for the video interface. The effective frames per second provides a relative measure of the performance of the video interface.

The operating environment 200 includes a computer 202, a monitor 204 and a user interface (UI) 206. The UI 206 is any suitable device which allows a user to enter data into the computer 202. Examples of the UI 206 include a keyboard or a game controller or a combination thereof. Yet another example of the UI 206 is a stylus such as the type used with a personal digital assistant or other similar device. Other examples of the UI 206 are described with reference to FIG. 1. The UI 206 may interface to the computer 202 via a driver 224. The monitor 204 is any suitable device for displaying images. The monitor 204 may be a separate device or alternatively integral with the computer 202.

The computer 202 is any device capable of being used to execute an application that displays images on the monitor 204. By way of example and not limitation, suitable devices include the computer 110 described with reference to FIG. 1. Other examples of a suitable computer 202 include a dedicated gaming system and personal digital assistant.

The computer 202 includes a video interface 208. As used herein, the term video interface refers the combination of a display driver 210 and a video card 212. The driver 224 for the UI 206 may form part of the video interface 208 or, alternatively, may be a separate and distinct component.

The video card 212 provides for physical connection to the monitor 204 and includes components such as memory 226 and a graphics processing unit (GPU) 228 for rendering a display, referred to herein as a frame and sending signals to the monitor which cause the frame to be displayed on the monitor. The display driver 210 is a software module that receives device independent requests from an application program and translates the requests into device specific instructions. The device specific instructions are used by the video card to render and display the frames on the monitor.

Evaluation module 218 executes a method for quantitatively determining relative performance of the video interface 208 in accordance with invention. The evaluation module 218 executes as an application in the computer 202. Alternatively, the evaluation module 218 may execute as part of the operating system 134.

To quantitatively determine the relative performance of the video interface 208, the evaluation module 218 determines an effective FPS based upon a measured FPS value and system utilization. System utilization is a measure of resource utilization by the video interface 208 while it executes instructions in accordance with requests received from a portion of the evaluation module 218, which is referred to herein as a benchmark 220.

Log 222 is an example of tool that is used by the evaluation module 218 to determine system resource utilization by the video interface 208. The log file includes entries that are created by the system at predetermined intervals. For example, an entry may be created by a system interrupt that periodically executes. At each interrupt cycle, the state of the machine is saved. The saved information includes, by way of example and not limitation, identification of a thread scheduled for execution as well as the process to which the scheduled thread belongs. Such log files are known in the art and, accordingly, are not described in further detail herein.

Figure 3:
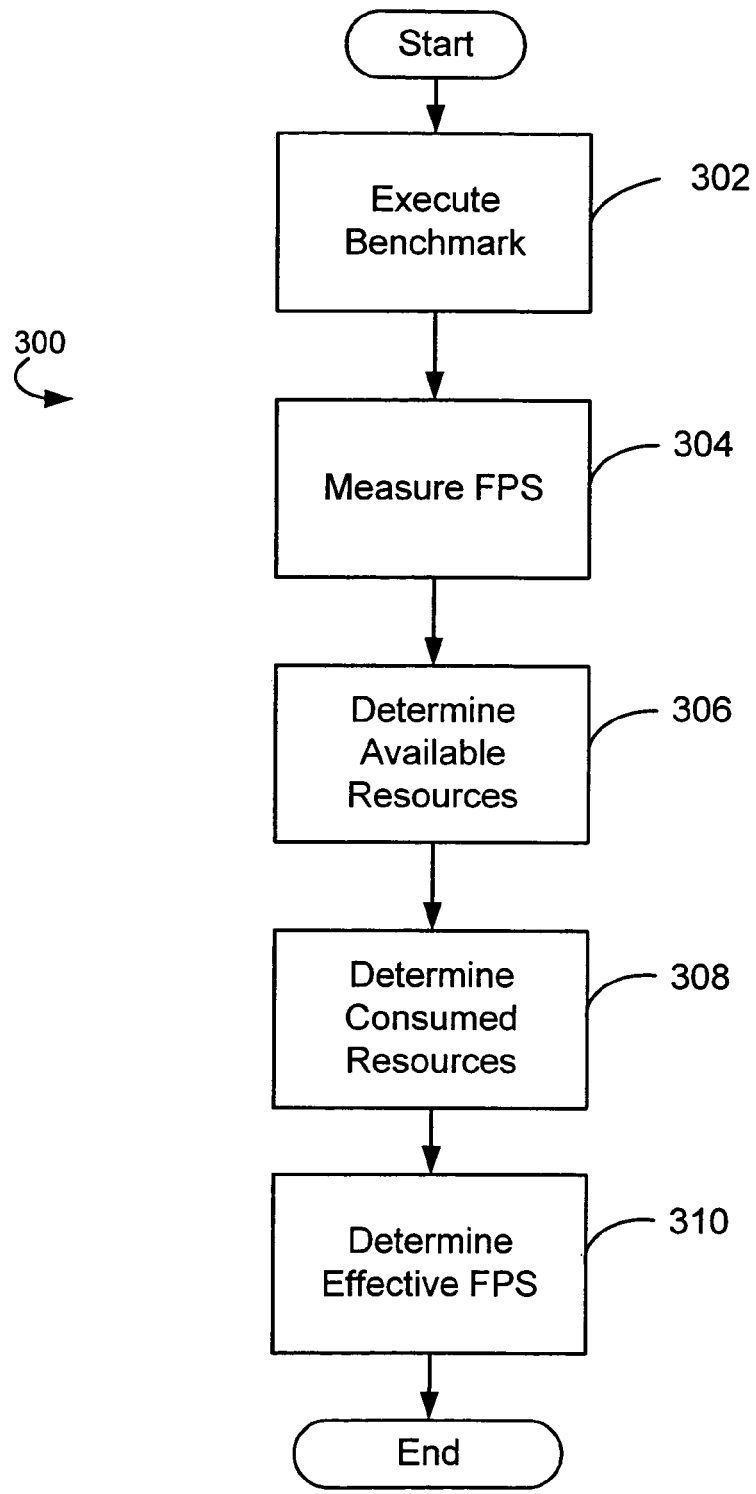
FIG. 3 is a flow chart generally illustrating a method for quantifying relative performance of a video interface according to the present invention.

Referring to FIG. 3, an example of a method 300 used by the present invention to determine the effective FPS of the video interface 208 will now be described. It will be understood that method 300 is provided by way of example and not limitation as any suitable method of determining an effective FPS based upon measured FPS and system utilization may be used.

In step 302, the benchmark process 220 executes. Execution of the benchmark process 220 causes a set of requests to be sent to display driver 210. These requests are translated and corresponding instructions are sent to the video card 212. Images are then rendered and displayed on the monitor 204. During execution of the benchmark 220, the video interface 208 uses system resources, e.g. accesses memory and executes processes that require CPU usage and the like. Although any set of requests may be used, it is preferable to select requests such that system utilization by the video interface 208 is comparable to system utilization that will occur when an application, such as a game, executes.

In step 304, a measured FPS value for the video interface 208 is obtained. The measured FPS value is obtained by executing a process designed to display sequential frames on the monitor. Preferably, the process is designed to obtain a maximum number of frames per second. An example of a suitable process is a portion of an application such as an existing game. Alternatively, the process can be developed to render and display images on the monitor 204. As yet another alternative, the process used to obtain the measured FPS may be the benchmark process 220. The design of processes which render and display images are well known and accordingly, this step is not described in further detail herein.

In step 306, the evaluation module 218 determines the CPU resources that remained available, i.e. were unused while the benchmark process executed. A method for determining the available resources is described in further detail with reference to FIG. 4 and FIG. 5. The available resources provide a measure of system resources that would be available to non-video output components of an application, such as artificial intelligence components, user input components, and the like.

In step 308, the evaluation module 218 determines the CPU resources that were consumed as a result of execution of the benchmark 220. The consumed CPU resources provide a measure of the CPU resources that an application, display driver 208, video card 212 and other components and processes require to handle video output. A method for determining the consumed resources is described in further detail with reference to FIG. 4 and FIG. 5.

In step 310, the evaluation module 218 determines the effective FPS. The effective FPS takes into account the measured FPS, the available CPU resources during execution of the benchmark, and the consumed CPU resources during execution of the benchmark. In general, the effective FPS is preferably proportional to the available CPU resources and inversely proportional to the consumed CPU resources. An example of an equation used to determine effective FPS is as follows:

$$FPS_{effective} = \frac{Resources\ Available}{Resources\ Consumed} \times FPS_{measured}$$

Wherein the following characterizes the recited parameters:
$FPS_{effective}$ represents the calculated effective FPS;
$FPS_{measured}$ represents the actual number of frames per second displayed on the monitor during execution of application or portion thereof;
Resources Available represents the number of CPU cycles not used by any process during execution of the benchmark.
Resources Consumed represents the number CPU cycles used as a result of execution of the benchmark process.

The effective FPS value may further be modified by a constant to normalize the determined effective FPS.

It will be understood that, although obtaining the measured FPS and determination of the consumed and available CPU resources are shown and described as separate from execution of the benchmark process 220, these steps (either singularly or collectively) are alternatively done during execution of the benchmark 304.

Figure 4:
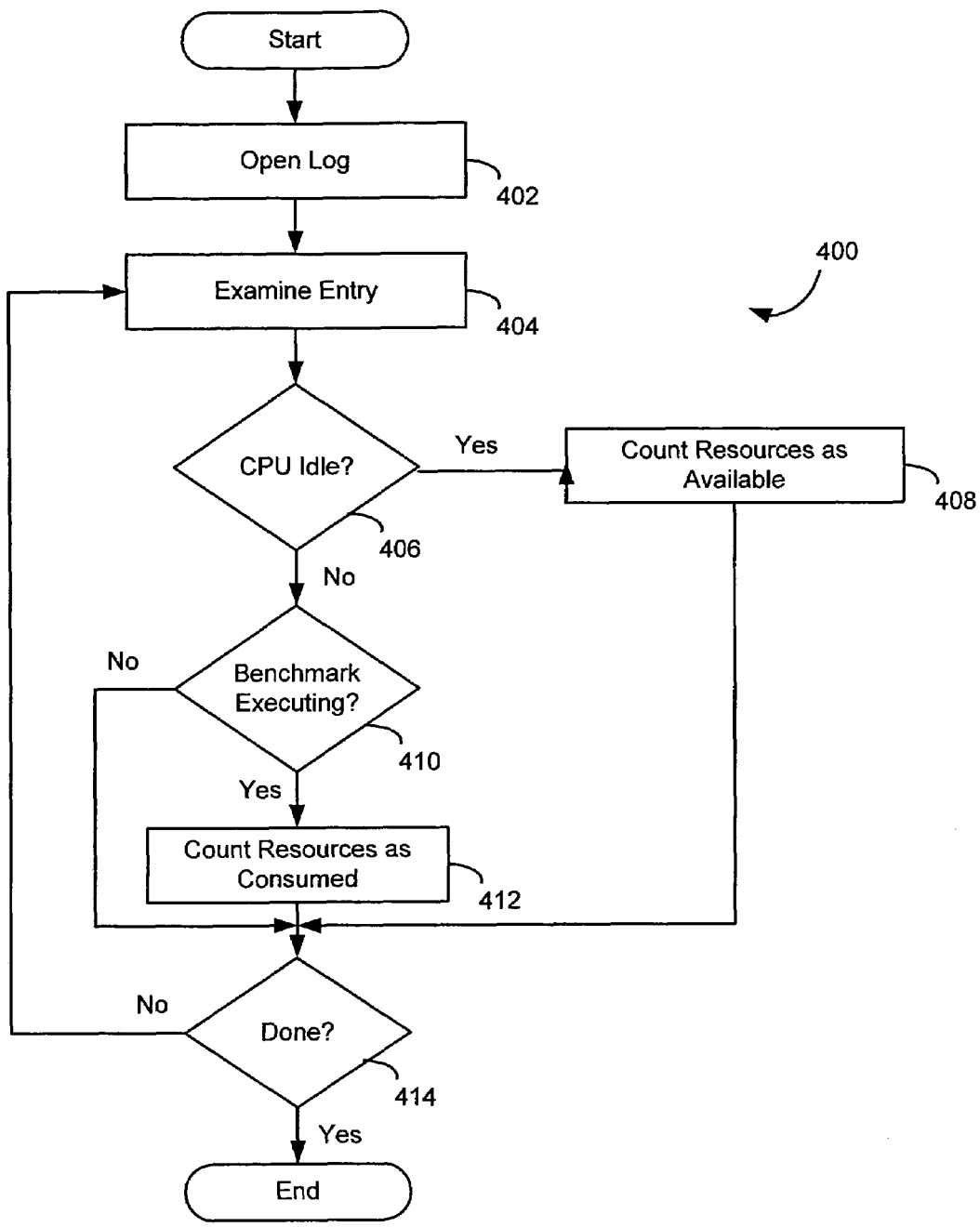
FIG. 4 is a flow chart generally illustrating a method for determining available and consumed resources.

FIG. 4 illustrates an example of a method 400 that may be used to determine the available CPU resources and the consumed CPU resources during execution of the benchmark. As previously described, the method 400 is carried out by, for example, examining a log of events occurring during execution of the benchmark. The entries in the log identify the state of the computer at predetermined intervals of time.

In step 402, the log 222 is opened. In step 404 an entry in the log 222 is examined to identify the state of the system at the time the entry was created. The first entry examined is the entry that represents the state when the benchmark 220 began execution. The state of the system is, for example, defined by a thread and associated process which is executing at that time. Once the state is identified, it is determined whether the state is an idle state as shown in step 406. In the idle state, no system process is executing, i.e. no system process is using the CPU. In the idle state, the current thread may be identified as an idle thread.

If, in step 406, it is determined that the system is an idle state, the system resources in that state are counted as available system resources as shown in step 408. The available system resources are measured in terms of CPU cycles or alternatively by the length of time the system remains in the idle state.

If, in step 406, it is determined that the state is not the idle state, i.e. some process is using the CPU, the evaluation modules 218 determines whether the executing process is part of the benchmark 220. Such processes include execution of tasks by the video interface 208. This is accomplished by, for example, examining the execution thread and identifying the process to which the thread belongs. If that process is associated with the benchmark 220, the system resources used are counted as consumed resources as shown in step 412. The consumed resources are, like available resources, measured in terms of time or CPU cycles. If the system resources are being used by some process unrelated to the benchmark 220, the resources are not counted as either consumed or available system resources as generally shown.

After the evaluation module 218 determines whether to count the resources as available or consumed, it determines in step 414 whether to continue to evaluate additional log entries. Additional log entries are evaluated until all states during execution of the benchmark are examined. If additional log entries need to be examined, the method 400 returns to step 404 wherein the next log entry is examined and process repeats. After all states are examined, the process ends as generally shown. Once the method 400 is complete, the effective FPS is determined as described with reference to FIG. 3.

The method 400 has generally been described with respect to a log file that is created while the benchmark executes and examining that log after execution of the benchmark process is complete. As previously described, in an alternate embodiment, the state of system and available and consumed resources can be tracked by the evaluation module 218 concurrently with execution of the benchmark 220 in which case the log file is not required.

Figure 5:
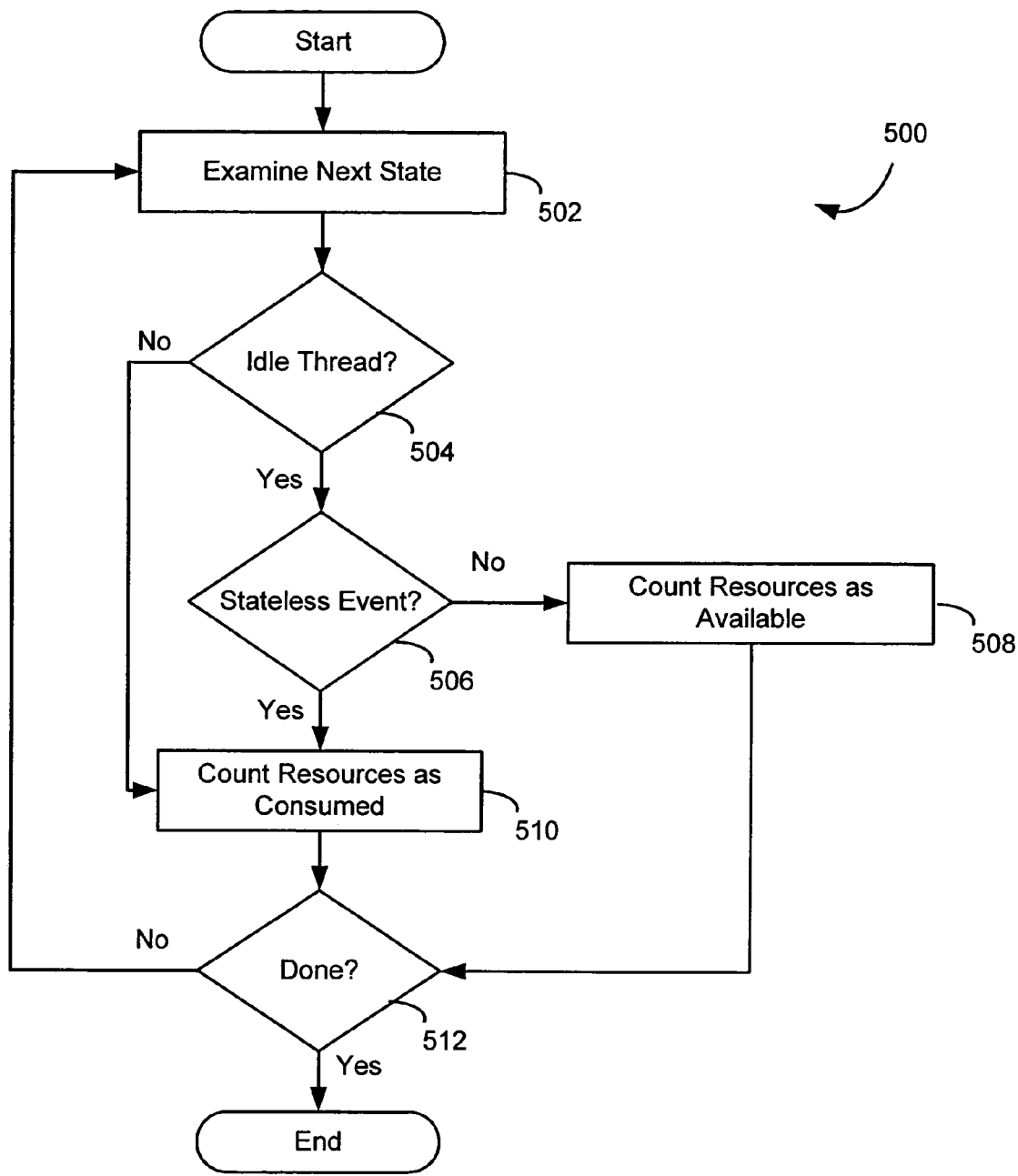
FIG. 5 is a flow chart generally illustrating a method for determining available and consumed system resources in a system that includes stateless events.

FIG. 5 illustrates a modified process 500 whereby the evaluation module determines available system resources. The modified process 500 is useful if the operating system executes certain events in a stateless environment.

Some operating systems execute stateless events. When the stateless event executes, the system does not change state. Rather, the system remains in its prior state while the stateless event executes. As such, it may not be possible to always determine whether a resource is available or consumed simply by looking at the existing state of the machine. For example, the state may appear to be an idle state even though a stateless event is executing. Examples of stateless events are an interrupt service routine (ISR) and delayed procedure call (DPC). The method 500 provides a way to account for stateless events to accurately determine the available system resources and approximated consumed resources during execution of the benchmark 220.

In step 502, the evaluation module 218 determines the state of the system by determining which thread has the CPU. As shown in step 504, if the thread is not the idle thread, then the system resources are counted as consumed resources as shown in step 510.

If, in step 504, it is determined that the thread is the idle thread, additional steps are carried out to determine whether the state is in fact the idle state. As shown in step 506, the evaluation module 218 determines whether a stateless event is executing while the idle thread has the CPU. As previously described, examples of such events are the ISR and DPC events. If a stateless event is not executing then the state is the idle state and the corresponding system resources are counted as available resources as shown in step 508. If, however, a stateless event is shown as executing, the system resources are determined not to be available and counted as consumed resources as shown in step 510.

In step 512, it is determined whether additional states occurring during execution of the benchmark remain to be examined. If additional states to be examined exist, the process returns to step 502 where the next state is examined. If all states occurring during execution of the benchmark have been examined, the process ends as shown.

It will be noted that the method 500 does not provide an exact measure of resources that are consumed as a result of execution of the benchmark 220. The reason is that stateless events affect the ability of the evaluation module 218 to determine whether system resources are consumed by the benchmark 220. A state may be identified as a state associated with the benchmark when in fact it is a stateless event. Even though the execution of the stateless event can be determined, it may not be possible to identify which process caused the stateless event to occur. As such, it may be difficult to determine the exact amount of system resources which are consumed by the benchmark.

In the method 500, the consumed resources are approximated by making certain assumptions. For example, it is assumed that aside from the benchmark only minimal processes are executing on the system and that only the benchmark is requesting that the video interface display images on the monitor. In this model, all non-idle states and all idle states wherein a stateless event executes are counted as consumed resources.

Although the approximation is not exact, it provides an accurate assessment of the relative performance of the video interface in a system. The reason is that the benchmark renders and displays frames on the monitor. Hence it is unlikely that other applications that require the video display will execute simultaneously. Further, to the extent other processes are executing and consuming system resources during execution of the benchmark, such processes will impact the performance of any application that uses the video interface. Thus, such other processes will have a negative impact of performance of the video interface and are properly taken into consideration when determining the effective FPS value.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. Additionally, although the method is described with reference to evaluating the performance of a video interface, it can be used to quantify the performance of any type of interface.

I claim:

1. A method for quantifying performance of a video interface that is adapted to be installed in a computer system, said video interface including a display driver and a video card, comprising:
    executing a benchmark application to send a set of requests to the video interface;
    measuring frames per second displayed on a monitor by the video interface while displaying the benchmark application;
    determining resource utilization as a result of execution of the benchmark application; and
    determining an effective frames per second based on the measured frames per second and the determined resource utilization while displaying the benchmark application wherein the effective frames per second is equal to the resources that remain available while the benchmark application is displaying divided by the resources that are consumed while the benchmark application is displaying multiplied by the frames per second of the display of the benchmark application.

2. The method of claim 1, wherein the step of determining resource utilization comprises:
    determining system resources that remain available while the benchmark application executes; and
    determining system resources that are consumed as a result of execution of the benchmark application.

3. The method of claim 2 whereby the steps of determining system resources that remain available and system resources that are consumed comprises:
    maintaining a log which identifies a state;
    determining whether the system is in an idle state;
    during the period in the idle state, determining whether a stateless event has occurred; and
    depending upon whether the stateless event has occurred, determining whether system resources are available or consumed.

4. The method of claim 2 wherein the system resources that are consumed is an approximate value determined based upon the total time consumed by all system resources during execution of the benchmark.

5. The method of claim 2 wherein the system resources that are consumed excludes CPU time used by processes unrelated to the benchmark application.

6. The method of claim 2 wherein the system resources that are consumed and the system resources that remain available are determined concurrently during execution of the benchmark application.

7. The method of claim 1, wherein the measured frames per second is determined concurrently during execution of the benchmark application.

8. The method of claim 2, wherein the determined system resources that are consumed is an approximate value.

9. A computer-readable medium having instructions for quantifying performance of a video interface that is adapted to be installed in a computer system, said video interface including a display driver and a video card, comprising:
    executing a benchmark application to send a set of requests to the video interface;
    measuring frames per second displayed on a monitor by the video interface while displaying the benchmark application;
    determining resource utilization as a result of execution of the benchmark application; and determining an effective frames per second based on the measured frames per second of the benchmark application and the determined resource utilization while displaying the benchmark application wherein
the effective frames per second is equal to the resources that remain available while the benchmark application is displaying divided by the resources that are consumed while the benchmark application is displaying multiplied by the frames per second of the display of the benchmark application.

10. The computer-readable medium of claim 9, whereby the step of determining resource utilization comprises:
determining system resources that remain available while the benchmark application executes; and
determining system resources that are consumed as a result of execution of the benchmark application.

11. The computer-readable medium of claim 10 whereby the steps of determining system resources that remain available and system resources that are consumed comprises:
maintaining a log which identifies a state;
determining whether the system is in an idle state;
during the period in the idle state, determining whether a stateless event has occurred; and
depending upon whether the stateless event has occurred, determining whether system resources are available or consumed.

12. The computer-readable medium of claim 10 wherein the system resources that are consumed is an approximate value determined based upon the total time consumed by all system resources during execution of the benchmark application.

13. The computer-readable medium of claim 10 wherein the system resources that are consumed excludes CPU time used by processes unrelated to the benchmark application.

14. The computer-readable medium of claim 2, wherein the determined system resources that are consumed is an approximate value.

15. A system for quantifying video performance, comprising:
a computer having a video interface including a display driver and a video card;
a monitor coupled to the video interface;
an evaluation module executing in the computer comprising
executing a benchmark process to send a set of requests to the video interface,
measuring the frames per second displayed on a monitor by the video interface,
determining resource utilization as a result of execution of the benchmark, and
determining an effective frames per second based on the measured frames per second and the determined resource utilization while displaying the benchmark process wherein the effective frames per second is equal to the resources that remain available while the benchmark process is displaying divided by the resources that are consumed while the benchmark process is displaying multiplied by the frames per second of the display of the benchmark process.

16. The system of claim 15 wherein the evaluation module maintains a log which identifies a state; determines whether the system is in an idle state; determines whether a stateless event has occurred; and establishes whether system resources are available or consumed.

17. The system of claim 16 wherein consumed resources are an approximate value determined based upon the total time consumed by all system resources during execution of the benchmark application.

18. The system of claim 16 wherein consumed resources exclude CPU time used by processes unrelated to the benchmark application.

* * * * *